US006627300B1

United States Patent
Kent et al.

(10) Patent No.: US 6,627,300 B1
(45) Date of Patent: Sep. 30, 2003

(54) OPTICAL DEVICE CONTAINING POLYMERIC MATERIAL DOMAINS HAVING DIFFERENT DEGREES OF RANDOMNESS

(75) Inventors: Susan L. Kent, Shorewood, MN (US); Ronald J. Tabar, St. Paul, MN (US); Richard C. Allen, Lilydale, MN (US); Elisa M. Cross, Woodbury, MN (US); William Ward Merrill, White Bear Lake, MN (US); Stephen A. Johnson, Woodbury, MN (US); Peter D. Condo, Lake Elmo, MN (US); Timothy J. Hebrink, Oakdale, MN (US); Joseph A. Gangi, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 154 days.

(21) Appl. No.: 09/686,519

(22) Filed: Oct. 11, 2000

Related U.S. Application Data

(60) Provisional application No. 60/158,867, filed on Oct. 12, 1997.

(51) Int. Cl.[7] .............................. B32B 5/00; B32B 5/02; B32B 27/36
(52) U.S. Cl. ....................... 428/212; 428/480; 428/323; 428/327; 525/88; 525/92 R; 525/92 F; 525/437; 525/444; 264/239; 264/280; 264/291; 359/483; 359/485; 359/487; 359/494; 359/500; 359/577; 359/580; 359/582; 359/586; 359/599
(58) Field of Search .................. 428/212, 323, 428/327, 480; 525/88, 92 R, 92 F, 437, 444; 264/239, 280, 291; 359/483, 485, 487, 494, 500, 577, 580, 582, 586, 599

(56) References Cited

U.S. PATENT DOCUMENTS 540,768 A   6/1895  Western 2,604,817 A   7/1952  Schupp ......................... 88/65
3,124,639 A   3/1964  Kahn ............................ 88/65

(List continued on next page.)

FOREIGN PATENT DOCUMENTS

| WO | WO 92/02584 | 2/1992 | |
| WO | WO 95/27919 | 4/1995 | ........... G02B/27/28 |
| WO | WO 95/17303 | 6/1995 | ............. B32B/7/02 |
| WO | WO 95/17691 | 6/1995 | ............. G02B/5/30 |
| WO | WO 95/17692 | 6/1995 | ............. G02B/5/30 |
| WO | WO 95/17699 | 6/1995 | ......... G02F/1/1335 |
| WO | WO 96/35571 | 11/1996 | |
| WO | WO 97/01440 | 1/1997 | ........... B32B/27/36 |
| WO | WO 97/01774 | 1/1997 | ............. G02B/1/10 |
| WO | WO 98/24844 | 6/1998 | |
| WO | WO 99/06203 | * 2/1999 | |
| WO | WO 99/36248 | 7/1999 | ........... B29C/47/70 |
| WO | WO 99/36262 | 7/1999 | ........... B32B/27/00 |
| WO | WO 99/36812 | * 7/1999 | |
| WO | WO 00/07043 | 2/2000 | |

OTHER PUBLICATIONS

"Poly(Ethylene Naphthalenedicarboxylate)/Poly(Ethylene Terephthalate)Blends", Research Disclosure, No. 28340, Nov. 1987, pp. 680–684.

(List continued on next page.)

*Primary Examiner*—Vivian Chen
(74) *Attorney, Agent, or Firm*—John A. Fortkort; Stephen C. Jensen

(57) ABSTRACT

An improved optical film having a continuous/disperse phase morphology and a method for making the same is provided. At least one of the continuous and disperse phases comprises a blend of homopolymers which are inter-reacted, as by transesterification. The resulting films exhibit a higher degree of birefringence for a given level of strain than analogous films in which the blend is replaced by a random copolymer.

46 Claims, 8 Drawing Sheets

U.S. PATENT DOCUMENTS

| | | | | |
|---|---|---|---|---|
| 3,213,753 | A | 10/1965 | Rogers | 88/65 |
| 3,546,320 | A | 12/1970 | Duling et al. | |
| 3,610,729 | A | 10/1971 | Rogers | 350/157 |
| 3,711,176 | A | 1/1973 | Alfrey, Jr. et al. | 350/1 |
| 3,860,036 | A | 1/1975 | Newman, Jr. | 138/45 |
| 3,937,754 | A | 2/1976 | Shimotsuma et al. | |
| 4,446,305 | A | 5/1984 | Rogers et al. | 528/348 |
| 4,520,189 | A | 5/1985 | Rogers et al. | 528/331 |
| 4,521,588 | A | 6/1985 | Rogers et al. | 528/363 |
| 4,525,413 | A | 6/1985 | Rogers et al. | 428/212 |
| 4,617,373 | A | 10/1986 | Pruett et al. | |
| 4,720,426 | A | 1/1988 | Englert et al. | 428/344 |
| 5,188,760 | A | 2/1993 | Hikmet et al. | 252/299.01 |
| 5,211,878 | A | 5/1993 | Reiffenrath et al. | 252/299.63 |
| 5,235,443 | A | 8/1993 | Barnik et al. | 359/37 |
| 5,269,995 | A | 12/1993 | Ramanathan et al. | 264/171 |
| 5,294,657 | A | 3/1994 | Melendy et al. | 524/270 |
| 5,316,703 | A | 5/1994 | Schrenk | 264/1.3 |
| 5,319,478 | A | 6/1994 | Fijnfschilling et al. | 359/53 |
| 5,389,324 | A | 2/1995 | Lewis et al. | 264/171 |
| 5,448,404 | A | 9/1995 | Schrenk et al. | 359/584 |
| 5,486,935 | A | 1/1996 | Kalmanash | 359/37 |
| 5,486,949 | A | 1/1996 | Schrenk et al. | 359/498 |
| 5,612,820 | A | 3/1997 | Schrenk et al. | 359/498 |
| 5,629,055 | A | 5/1997 | Revol et al. | 428/1 |
| 5,686,979 | A | 11/1997 | Weber et al. | 349/96 |
| 5,699,188 | A | 12/1997 | Gilbert et al. | 359/584 |
| 5,721,603 | A | 2/1998 | De Vaan et al. | 349/194 |
| 5,744,534 | A | 4/1998 | Ishiharada et al. | 524/442 |
| 5,751,388 | A | 5/1998 | Larson | 349/96 |
| 5,767,935 | A | 6/1998 | Ueda et al. | 349/112 |
| 5,770,306 | A | 6/1998 | Suzuki et al. | 428/328 |
| 5,783,120 | A | 7/1998 | Ouderkirk et al. | 264/134 |
| 5,783,129 | A | 7/1998 | Shirai et al. | |
| 5,793,456 | A | 8/1998 | Broer et al. | 349/98 |
| 5,808,794 | A | 9/1998 | Weber et al. | 359/487 |
| 5,811,493 | A | 9/1998 | Kent | |
| 5,825,542 | A | 10/1998 | Cobb, Jr. et al. | 359/487 |
| 5,825,543 | A | 10/1998 | Ouderkirk et al. | 359/494 |
| 5,831,375 | A | 11/1998 | Benson, Jr. | 313/110 |
| 5,867,316 | A | 2/1999 | Carlson et al. | 359/500 |
| 5,882,774 | A | 3/1999 | Jonza et al. | 428/212 |
| 5,940,149 | A | 8/1999 | Vanderwerf | 349/5 |
| 5,940,211 | A | 8/1999 | Hikmet et al. | |
| 5,962,114 | A | 10/1999 | Jonza et al. | 428/212 |
| 5,965,247 | A | 10/1999 | Jonza et al. | 428/212 |
| 5,976,424 | A | 11/1999 | Weber et al. | 264/1.6 |
| 5,991,077 | A * | 11/1999 | Carlson et al. | 359/500 |
| 6,005,713 | A * | 12/1999 | Carlson et al. | 359/500 |
| 6,031,665 | A * | 2/2000 | Carlson et al. | 359/494 |
| 6,057,961 | A * | 5/2000 | Allen et al. | 359/494 |
| 6,090,898 | A | 7/2000 | Tsunekawa et al. | |
| 6,111,696 | A * | 8/2000 | Allen et al. | 359/495 |
| 6,111,697 | A | 8/2000 | Merrill et al. | |
| 6,141,149 | A * | 10/2000 | Carlson et al. | 359/500 |
| 6,179,948 | B1 | 1/2001 | Merrill et al. | |
| 6,268,961 | B1 * | 7/2001 | Nevitt et al. | 359/488 |
| 6,307,676 | B1 | 10/2001 | Merrill et al. | |
| 6,329,046 | B1 * | 12/2001 | Merrill et al. | 428/212 |

OTHER PUBLICATIONS

"Poly(Ethylene Naphthalenedicarboxylate)/Poly(Ethylene Terephthalate) Blends", Research Disclosure, No. 29410, Oct. 1988, pp. 714–719.

Anonymously Disclosed Polarizer, 35117 Research Disclosure, Jul. 1993, Emsworth Design Inc., Kenneth Mason Publications LTD., United Kingdom, pp. 452–453.

Aphonin, O. A., Optical Properties of Stretched Polymer Dispersed Liquid Crystal Films: angle–dependent Polarized Light Scattering, Liquid Crystals, 1995, vol. 19, No. 4, 469–480.

Frensdorff, H. K., Block–Frequency Distribution of Copolymers, Macromolecules, vol. 4, No. 4, Jul.–Aug. 1971, pp. 369–375.

Land, H., Some Aspects of the Development of Sheet Polarizers, Optical Society of America, (repr. Jour. of the Optical Soc. Of America, vol. 4(12) 957–963 (Dec. 1951)) p. 45–51.

Lopez–Serrano, F., et al., Recursive approach to copolymerization statistics, Polymer, vol. 21,Mar. 1980, pp. 263–273.

Schrenk et al., Nanolayer polymeric optical films, Tappi Journal, pp. 169–174, Jun., 1992.

Stewart, Mark E. et al., Reactive processing of poly(ethylene 2,6–naphthalene dicarboxylate)poly(ethylene terephthalate) blends, Polymer, vol. 34, No. 19, 1993, pp. 4060–4067.

Urbas, Augustine, et al., One–Dimensional Periodic Dielectric Reflectors from Self–Assembled Block Copolymer–Homopolymer Blends, Macromolecules, vol. 32, 1999, pp 4728–4750.

Weber et al., "Giant Birefringent Optics in Multilayer Polymer Mirrors", Science, vol. 287, Mar. 31, 2000, pp. 2451–2456.

* cited by examiner

OPTICAL DEVICE CONTAINING POLYMERIC MATERIAL DOMAINS HAVING DIFFERENT DEGREES OF RANDOMNESS

This application claims priority from Provisional Application No. 60/158,867, filed Oct. 12, 1999.

FIELD OF THE INVENTION

The present invention relates generally to optical devices such as polarizers, diffusers, and mirrors, and more particularly to improvements in the materials used to make such devices.

BACKGROUND

Various optical films and devices are known to the art which rely upon refractive index differentials, sometimes produced by strain-induced birefringence, to achieve certain optical effects, such as the polarization of randomly polarized light. Such films and devices may be in the form of a multilayer stack in which index differentials between adjacent layers in the stack give rise to certain optical properties, as in the films disclosed in U.S. Pat. No. 5,882,774 (Jonza et al.). Other optical devices comprise a disperse phase which is disposed in a continuous matrix, and derive their optical properties from refractive index differentials between the continuous and disperse phases. The materials disclosed in U.S. Pat. No. 5,825,543 (Ouderkirk et al.) are representative of this type of a system. Various hybrids of the aforementioned systems are also known, such as the multilayer optical films disclosed in U.S. Pat. No. 5,867,316 (Carlson et al.), wherein the film comprises a multilayer stack having a repeating layer sequence in which at least one of the layers has a continuous phase/disperse phase morphology. Various other optical films and devices are also known to the art, and are described in U.S. Pat. No. 5,831,375 (Benson, Jr.), U.S. Pat. No. 5,825,542 (Cobb, Jr. et al.), U.S. Pat. No. 5,808,794 (Weber et al.), U.S. Pat. No. 5,783,120 (Ouderkirk et al.), U.S. Pat. No. 5,751,388 (Larson), U.S. Pat. No. 5,940,211 (Hikmet et al.), U.S. Pat. No. 3,213,753 (Rogers), U.S. Pat. No. 2,604,817 (Schupp, Jr.), Aphonin, O. A., "Optical Properties of Stretched Polymer Dispersed Liquid Crystal Films: Angle-Dependent Polarized Light Scattering", *Liquid Crystals*, Vol. 19, No. 4, pp. 469–480 (1995), Land, E. H., "Some Aspects of the Development of Sheet Polarizers, ©1951 Optical Society of America, Reprinted from *Journal of the Optical Society of America*, Vol. 41(12), 957–963, (December 1951), pp. 45–51 and 2244 Research Disclosure (1993), July, No. 351, Emsworth, GB, "Polarizer", pp. 452–453.

In the past several years, a number of advances have been made in the materials sciences, especially in the area of block copolymers, which have resulted in the development of new and interesting materials and methods for making and using these materials to various ends. In some cases, these advances have led to applications in the field of optical films and devices. Thus, for example, Urbas et al., "One-Dimensional Peroidic Reflectors from Self-Assembly Block Copolymer-Homopolymer Blends," Macromolecules, Vol. 32, pages 4748–50 (1999), report the formation of well ordered photonic crystals similar to a multilayer quarter wave stack comprising self assembling blends of block copolymers optionally containing homopolymers. One embodiment describes the formation of a narrow band reflector. Also summarized is the use of neat block copolymers as well as copolymers comprising liquid crystalline materials as means of producing periodicities in block copolymer materials.

U.S. Ser. No. 08/904,325 (Weber et al.)(corresponding to WO 9906203) discloses the transesterification or reaction of polyesters lying in adjacent layers of a multilayer optical stack for the express purpose of improving interlayer adhesion. It is assumed that the thickness of the interface comprising the reacted materials is sufficiently thin so as not to otherwise affect the optical properties of the optical stack except at the interface.

U.S. Ser. No. 09/006,455 (Merrill et al.)(corresponding to WO 9936812) discloses the use of transesterified blends of PEN and PET within a single layer in a multilayer optical stack for the purpose of producing optical devices such as polarizers and mirrors.

U.S. Pat. No. 3,546,320 (Duling et al.) discloses transesterification methods for preparing a semicrystalline composition comprising 94 to 60 weight percent polyalkylene terephthalates, 6 to 40 weight percent polyalkylene naphthalene-2,6-dicarboxylate, and at least 5 weight percent of a block copolymer comprising discrete polymer segments of the percent polyalkylene terephthalate and the polyalkylene naphthalene-2,6-dicarboxylate. The block copolymer is prepared by melt transesterification of the individual homopolymers, and the degree of transesterification is controlled by the mixing time. Duling demonstrates a total loss of crystallinity of the block copolymer after extensive transesterification, depending on the composition.

U.S. Pat. No. 3,937,754 (Sagamihara et al.) discloses a biaxially oriented polyethylene-2,6-naphthalate (PEN) film containing a polyester resin other than PEN in an amount of 0.5 to 10 percent by weight based on the PEN, and a process for its production. The reference notes that when the PEN resin (1) is blended in the molten state with a polyester resin (2), the softening point of the blended mixture decreases gradually from the softening point of the PEN until it finally reaches a certain point, referred to as an equilibrium softening point. The reference teaches that this softening point coincides with the softening point of a PEN copolymer obtained by copolymerising monomers of the same composition and proportion as the monomers which constitute the PEN resin (1) and the polyester resin (2). From this fact, the reference presumes that reaction occurs via a stage of forming a block copolymer, where given enough reaction time a copolymer will be obtained.

Research Disclosures 28,340 and 29,410 disclose transesterified products of PEN, PET, and other polymers comprising dibasic acids. Typical dibasic acids include isophthalic, adipic, glutaric, azelaic, and sebacic acid and the like. The PEN based polymers are generally based on 2,6-naphthalene-dicarboxylic acid but may be based on 1,4-, 1,5-, or 2,7-isomers or mixtures of these isomers. These teachings primarily address the ability to control mechanical and physical properties such as modulus, gaseous permeabilities, and glass transition temperatures.

WO 92/02584 (Cox et al.) disclose the use of phosphite materials to control the rate of transesterification during solid state polymerization, primarily for the intended use of improving physical and mechanical properties, such as gaseous diffusion, in the final product application. The reference discloses blends of PEN and PET homopolymer pellets, which are held at a temperature range between the higher glass transition temperature and the lower melting temperature.

Despite the many advances noted above in the area of optical films and devices, a number of problems still persist in the art. For example, it is often desirable to rely on strain-induced birefringence to achieve desirable optical properties in an optical film, since the film can be conveniently oriented in a controlled manner on a laboratory stretcher in accordance with well established methodologies and principles. However, these methodologies do not work equally well for all materials selections. In particular, problems are frequently encountered with the use of thermodynamically immiscible polymers whose interfacial strength is not large, because the resulting film cannot always be stretched to a high enough draw ratio to achieve an optimal level of birefringence. In the case of a continuous/disperse phase system, for example, orienting such a film to the draw ratios required for optimal birefringence may lead to voiding at the interface between the two phases, thereby compromising the desired optical properties (e.g., polarizing properties) of the system. Voiding of this type is described in U.S. Pat. No. 5,811,493 (Kent), where it is used to produce paper-like films which are diffusely reflective to both polarizations of light. Unfortunately, if lower draw ratios are used to prevent voiding, the resulting film may have a lower degree of birefringence and less than optimal optical properties.

There is thus a need in the art for a method for achieving a desired degree of birefringence in an optical film or device while reducing the draw ratio normally required to achieve the desired level of birefringence. There is also a need in the art for a method for making optical films and devices from thermodynamically immiscible polymers whose interfacial strength is not large, wherein the films and devices are capable of being oriented to the higher draw ratios frequently required to achieve a higher degree of birefringence and optimal optical properties. These and other needs are met by the present invention, as hereinafter described.

SUMMARY OF THE INVENTION

Figure 1:
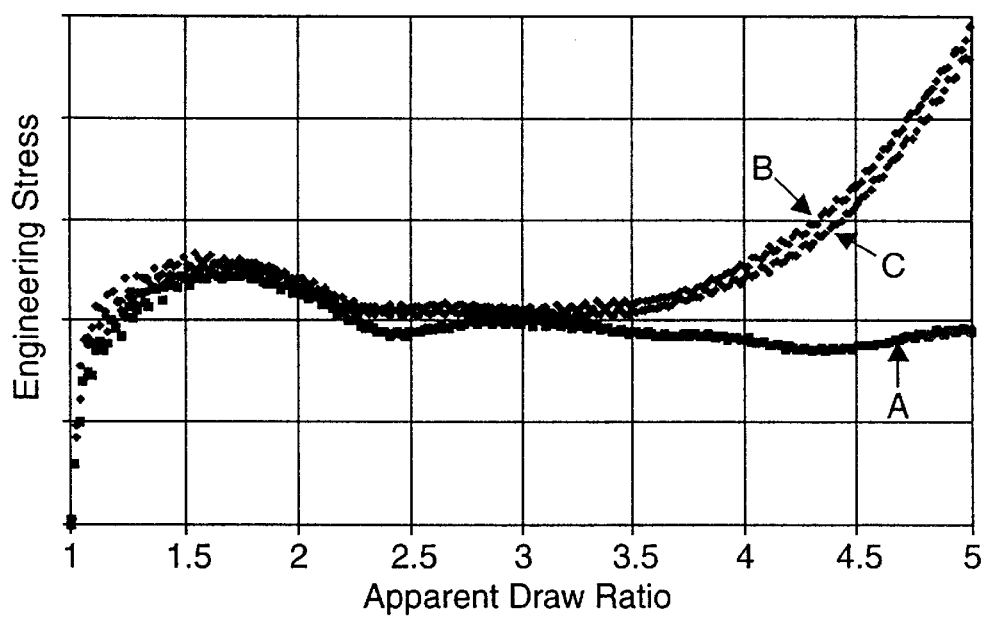
FIG. 1 is a plot of engineering stress as a function of apparent draw ratio.

In one aspect, the present invention relates to a method for making a continuous/disperse phase optical device, such as a mirror, polarizer, or diffuser, and to optical devices so made. In accordance with the method, at least one of the continuous and disperse phases is fabricated from a blend of homopolymers under conditions that allow the homopolymers to inter-react (e.g., through transesterification or transamidization) to form a copolymer which can be used to make an optical device having improved physical and optical properties.

In another aspect of the invention, the present invention relates to continuous/disperse phase optical devices made from a blend of homopolymers that are capable of inter-reacting, such devices having better physical and optical properties as compared to an analogous system in which the blend of homopolymers is replaced by a copolymer of the same monomers in the same ratios, but not made from homopolymers. Some of the improved physical and optical effects observed with such a system include increased gain, higher intrinsic viscosities, and an earlier onset of strain-hardening (that is, the optical devices of the present invention exhibit a higher level of birefringence for a given level of strain than their random copolymer counterparts). The later property is especially advantageous in systems in which the materials of the continuous and disperse phases have poor adhesion, because it allows such systems to achieve a desired degree of birefringence at a lower draw ratio, thereby avoiding or minimizing voiding between the two phases. The degree of inter-reaction may be manipulated through control of processing conditions, such as residence time, so as to achieve desirable properties in the resulting optical device, but the degree of randomness will typically be less than 70%.

The use of a blend of homopolymers in accordance with the method of the present invention allows for the attainment of higher molecular weights (and, therefore, higher intrinsic viscosities) than those achievable with the aforementioned statistically random copolymer analogs. Surprisingly, continuous/disperse phase optical devices which are made with such blends exhibit increased gain as compared to their statistically random analogs, even though the average particle size of the disperse phase in systems made with the blend materials was not observed to be smaller than the average particle size of the disperse phase in systems made with the random copolymer analogs, as might have been expected had there been a larger difference in intrinsic viscosities of the final films.

In another aspect, the present invention relates to a method for making an improved optical device, such as a mirror, polarizer, or diffuser, from a continuous/disperse phase system, and to the optical devices so produced. Surprisingly, applicants have discovered that, when at least one of the continuous and disperse phases comprises a block copolymer, the degree of randomness of the monomeric units of the copolymer can be manipulated to maximize the strain-induced birefringence achievable in the system. In particular, through proper manipulation of the degree of randomness in the copolymer, a higher degree of birefringence can be obtained under the same stretching conditions than is achievable for a similar system in which the sequence lengths of the monomeric units are statistically random.

In a related aspect, the present invention relates to a method for improving the physical and optical properties of a continuous/disperse phase optical body in which at least one of the phases comprises a statistically random copolymer of two or more monomers, incorporated into optical devices made according to the method. In accordance with the method, the statistically random copolymer is replaced with a blend of homopolymers of the same monomers, such that the ratios of the monomers remains the same.

In still another aspect, the present invention relates to optical devices, such as mirrors, polarizers, or diffusers, which have a first material domain of copolymer $P_r$ and a second material domain of copolymer $P_n$, and to methods for making the same. Copolymers $P_r$ and $P_n$ are chemically identical in that they are derived from the same monomers and in that the constituent monomers are present in each copolymer in the same ratios. However, copolymer $P_r$ possesses a higher degree of randomness than copolymer $P_n$. The difference in randomness between the two copolymers may be advantageously utilized to obtain refractive index differentials between the material domains, thereby giving rise to desirable optical properties. In some cases, these differentials may be achieved simply by coextruding the two polymers or by mixing them together; however, in the preferred embodiment, the differentials are achieved through strain-induced birefringence, e.g., by stretching the first and/or second material domains. The material domains may be present in a variety of morphologies, but are preferably present as the phases in a continuous/disperse phase film or device or as the layers in a multilayer film or device. Such devices may be obtained, for example, by blending or multilayer co-extruding two copolymers under conditions that minimize interdiffusion and chemical reactions such as transesterification between the two phases, and then drawing under conditions (e.g., temperatures) at which only one of the copolymers orients or crystallizes. Adjustment of the molecular weight may also be used between the two phases. For example, a less random copolymer may be chosen as the material of high birefringence. The blend or multilayer might then be drawn at a temperature at which the less random copolymer more strongly orients and more quickly crystallizes than the more random co-polymer. In some cases, a temperature for draw can be chosen above the melting point of the more random copolymer but below the melting point of the less random copolymer. Quick quenching after drawing may be used advantageously in such cases.

This methodology of obtaining index differentials is applicable to a wide variety of optical devices, but is particularly useful for producing forward-scattering diffusers. Moreover, since the domains are chemically identical, many of the problems that are often encountered with systems based on diverse polymeric materials (e.g., voiding or delamination) are avoided. Devices of this type may be advantageously produced by manipulating the differences in physical properties, such as crystallinity and melting point, which arise from the difference in degree of randomness between the two polymers. Thus, for example, a continuous/disperse phase device may be obtained by blending the two copolymers at a temperature at which only one of the copolymers is molten.

In a related aspect, the present invention relates to optical devices, such as mirrors, polarizers, or diffusers, which have a first material domain of copolymer $P_r$ and a second material domain of copolymer $P_n$, and to methods for making the same. In accordance with this aspect, the copolymers $P_r$ and $P_n$ need not be identical. However, the degree of randomness of at least one of $P_r$ and $P_n$ is manipulated to increase or decrease the refractive index differentials between the two domains along at least one axis. Thus, for example, the degree of randomness of at least one of the copolymers may be decreased to produce a larger refractive index differential between the two material domains along at least one axis.

In still another aspect, the present invention relates to a method for making an optical device, and to an optical device so made. In accordance with the method, at least two copolymers $P_r$ and $P_n$ are provided, wherein each of $P_r$ and $P_n$ are polyesters, wherein $P_r$ and $P_n$ are derived from monomers selected from the group consisting of monomers $m_1, \ldots, m_k$, wherein the % by weight of each of monomers $m_1, \ldots, m_k$ present in $P_r$, based on the total weight of $P_r$, is $w_{r1}, \ldots, w_{rk}$, respectively, wherein the % by weight of each of monomers $m_1, \ldots, m_k$ present in $P_n$, based on the total weight of $P_n$, is $w_{n1}, \ldots, w_{nk}$, respectively, wherein the magnitude of the vector $|w_r - w_n|$ is less than about 15%, preferably less than about 10%, more preferably less than about 5%, and most preferably less than about 2%, where $w_r = [w_{r1}, \ldots, w_{rk}]$ and $w_n = [w_{n1}, \ldots, w_{nk}]$, and wherein copolymers $P_r$ and $P_n$ have a difference in degree of randomness of k. The difference in degree of randomness may be obtained, for example, by controlling the degree of inter-polymerization or blockiness within the copolymers $P_r$ and $P_n$ such that $P_r$ is more extensively trans-polymerized than $P_n$. Typically, k will be at least about 30%, more preferably at least about 50%, and most preferably at least about 60%. A similar relationship may be employed using % molar volumes in place of weight %.

An article such as a film is then created from the copolymers $P_r$ and $P_n$ such that the copolymers are present as first and second material domains within the article, and such that the absolute value of the difference in refractive indices between the first and second material domains is at least 0.02, more preferably at least 0.03, and most preferably at least 0.05 along a first axis, and is less than 0.01, and preferably essentially zero, along a second axis. The material domains may be present, for example, as the phases in a continuous/disperse phase film, or as distinct layers in a multilayer film. The index differentials may be advantageously obtained by stretching the film in at least one direction, although the present invention also contemplates other known methods of obtaining the desired refractive index differentials. Because of the chemical similarity of the first and second material domains, optical devices made in accordance with this methodology exhibit superior physical properties (e.g., improved resistance to delamination or voiding), while the difference in degree of randomness or blockiness in the copolymers gives rise to desirable optical properties.

DETAILED DESCRIPTION OF THE INVENTION

As used herein, the following abbreviations have the following meanings:

"T" refers to dimethyl terephthalate.

"N" refers to naphthalene dicarboxylate.

"E" refers to ethylene glycol.

"coPEN" refers to a copolymer based on naphthalene dicarboxylate and dimethyl terephthalate and ethylene glycol.

"PEN" refers to polyethylene naphthalate.

"PET" refers to polyethylene terephthalate.

"NDC" refers to naphthalene dicarboxylate.

"DMT" refers to dimethyl terephthalate.

"EG" refers to ethylene glycol.

"I.V." refers to intrinsic viscosity.

"Δn" refers to birefringence, and is defined as the index of refraction in the principle draw direction minus the index of refraction in a perpendicular direction. Where referred to herein, indices of refraction are measured at 632.8 nm, as the index of refraction typically increases with decreasing wavelength due to dispersion.

In addition to its use in creating block copolymers, solid state polymerization is a process commonly used to increase the molecular weight of polyesters including polyethylenenphthalate (PEN) and polyethyleneterephthalate (PET). As has been taught in prior applications describing continuous and disperse phase optical devices, such as, for example, U.S. Pat. Nos. 5,825,543 (Ouderkirk, et al.), 5,783,120

(Ouderkirk, et al.), and 5,867,316 (Carlson et al.), the contents of which are herein incorporated by reference in their entirety, the particle size of the disperse phase is an important parameter to control in optimizing these devices. Matching the viscosities of the two phases is one method of minimizing and controlling the particle size of the disperse phase. During solid state polymerization, polymer pellets comprising polyesters of the type described are crystallized and then typically raised to a temperature of 235° to 255° C. under vacuum of less than 5 torr to drive off the polycondensation by-product ethylene glycol and thus increase molecular weight. Below temperatures of 210° C., solid state polymerization of aromatic polyesters becomes impractical due to extremely slow reaction rates and thus long polymerization times. Long polymerization times can make the process and/or materials cost prohibitive. Since the melting point of some random copolyesters are lower than 210° C., the use of higher temperatures will cause an agglomerate of the pellets into an undesirable solid mass. Thus, it is impractical and cost prohibitive to solid state polymerize random copolyethylenenaphthalates with less than about 75 mole percent naphthalate content. Copolymers of polyethylenenaphthalate having less than 75 mole percent naphthalate are desirable, however, for use in optical devices such as polarizers and mirrors due to their improved color, lower dispersion, reduced degradation by light, including UV light, in the range of about 380 to 400 nm, and lower cost. Advantages of low naphthalate content resins are described in applicants copending U.S. patent application Ser. No. 09/416462 filed on even date herewith under attorney docket number 55028USA1A, which is herein incorporated by reference.

High molecular weight copolyethylenenaphthalates with less than about 75 mole percent naphthalate can be created by extrusion blending and transesterifying high molecular weight polyethylene terephthalate (PET) with high molecular weight polyethylene naphthalate (PEN). One can achieve higher viscosities of a copolymer of PET and PEN than can be obtained during polymerization in conventional reactor processes since solid state polymerized PET and PEN with higher viscosities can be used as starting homopolymers. In accordance with the present invention, the birefringence and other optical and physical properties of a continuous/disperse phase system comprising a statistically random, or nearly random, copolymer of two or more monomers may be improved by replacing the random or nearly random copolymer with a copolymer which comprises the same ratios of the individual monomers, but whose degree of randomness is less than that of a statistically random copolymer. Preferably, the replacement copolymer is a blend of condensation homopolymers of the individual monomers which are capable of inter-reacting with each other (e.g., by undergoing transesterification, transamidization, or similar reactions) to a degree that can be controlled so as to result in a copolymer whose degree of randomness is less than that of a statistically random copolymer.

Polarizers, mirrors, diffusers, and other optical elements made from the continuous/disperse phase systems of the present invention have several advantages over analogous systems which utilize statistically random copolymers. In particular, the monomer ratios and the degree of transesterification or other inter-reaction can be conveniently controlled at the time of extrusion, thereby allowing one to optimize the amount of birefringence achievable under a given set of stretching conditions. Moreover, the continuous/disperse phase systems of the present invention can be fabricated from homopolymers which are typically less expensive and more readily available in higher molecular weights than is typically the case with custom copolymers. Additionally, in contrast to a process that requires pre-made copolymer materials, the process of the present invention allows for greater compositional flexibility of the copolymer, in that the composition can be easily controlled or changed during extrusion.

In an optical device comprising a continuous and disperse phase system, one of the methods of improving the optical performance of the device is to maximize the birefringence of at least one of the phases in at least one of three orthogonal directions while minimizing the refractive index mismatch between the two phases along at least another of the orthogonal directions. It has been found in the present invention that a given level of birefringence can be achieved sooner (e.g., at a lower draw ratio) for block copolymers and/or statistically non-random copolymers of the type described above than is the case with a statistically random copolymer analog. The ability to achieve a given degree of birefringence at a lower draw ratio is particularly advantageous when it is desirable to utilize for the continuous and disperse phases thermodynamically immiscible polymers whose interfacial strengths are not large, since the use of a lower draw ratio has less of a tendency to compromise the interfacial contact between the two phases (e.g., by inducing voiding).

In the context of the present invention, transesterification, transesterifying and transesterifies are meant to include reaction of condensation polymers such as polyesters, polyamides, copolyesteramides, and certain methine moieties intended to provide color, UV stability, or other desirable properties. Materials useful in the present invention include polyesters, polyamides, copolyesteramides, as well as other materials, for example those mentioned in U.S. Pat. No. 4,617,373 (Pruett et al.).

In many embodiments of the present invention, the degree of transesterification is controlled in the thermoplastic component(s) of at least one phase of a continuous/disperse phase optical device such that a statistically non-random copolymer results which preferably inter-reacts to an extent such that the degree of randomness is less than about 70%, preferably less than about 50%, and more preferably about 40% or lower. Methods available to achieve the desired degree of randomness include melt processes, as well as solid state polymerization processes which can occur prior to melt processing. Various parameters may be used to control the rate of the inter-reaction, including, but not limited to, the molecular weight of the individual blocks and of the entire block copolymer, the temperature of reaction, the state of matter in which the reaction is performed (e.g., whether it is performed in the solid or molten state), and the time allowed for the reaction to complete. Optionally, any of the methods may use additives such as stabilizers and antioxidants to further accelerate or retard the rate of inter-reaction.

For example, an optical device useful as a polarizer comprises a continuous phase and a disperse phase. The optical device operates by substantially matching the refractive index between the continuous and disperse phases along at least a first of three orthogonal directions and substantially mismatches the refractive index between the two phases along at least a second of three orthogonal directions. Mechanisms by which the index is substantially matched in at least a first direction and mismatched along at least a second direction are known to the art and are described, for example, in U.S. Pat. No. 5,783,129 and in U.S. Ser. No. 09/006,455 (Merrill et al.) (corresponding to WO 9936812), filed on Jan. 13, 1998, both of which are hereby incorporated by reference in their entirety.

In brief, substantially matching the refractive index is largely accomplished by judicious selection of materials and processing techniques. For example, orientation of a material along a first direction may alter the refractive index in that and other directions by an amount that depends upon the temperature and rate of orientation. Therefore, in order to match the refractive index of the continuous phase with that of the disperse phase, one must start with materials whose nominal refractive indices are appropriately different from one another, such that the birefringence that develops during orientation in one or both phases produces the substantial match.

However, when at least one of the continuous or disperse phase materials comprises a copolymer—particularly when the copolymer is capable of strain induced and/or quiescent crystallization, it has been determined by the present inventors that in addition to the degree, temperature, and rate of orientation, the amount of birefringence that develops will also be dependent upon the degree of randomness of the individual monomer units comprising the copolymer or on the intrinsic viscosities of the homopolymers and the resulting copolymer.

In one embodiment, miscible polymers comprising the individual monomers are envisioned as useful for the present invention. At least one of the polymers used should ideally be capable of developing a high degree of birefringence. The differences in birefringence may be due to a wide variety of factors. Without wishing to be restrictive, at least some of these characteristics will include the amount of crystallinity that forms during orientation as well as the intrinsic birefringence of the random versus the block copolymer. For a given molecular weight and a copolymer comprising two monomers of equal amounts, the statistically random copolymer and a di-block copolymer define the extremes in attainable degree of randomness.

In an illustrative embodiment, the continuous phase material is a polyester where the monomers comprise dimethyl terephthalate (T), naphthalene dicarboxylate (N), and ethylene glycol (E). Homopolymers of these monomers are commonly known as polyethylene terephthalate (PET) and polyethylene naphthalate (PEN). That is, PET corresponds to the sequence TE—TE—TE— . . . and PEN corresponds to the sequence NE—NE—NE— . . . The degree of randomness of NE or TE blocks can be approximated by the ratio of the fraction of observed NET triads to the statistically random probability of an NET triad, assuming random placement. The procedure to determine triads has been described by Stewart and Cox in *Polymer*, Vol. 34, pp. 4060–67 (1993). It can be 30 shown that the statistically random probability of NET triads is given by the product: $2 \times Wt \times Wn$, where Wt is the mole fraction of T monomer and Wn is the mole fraction of N monomer. The degree of randomness is defined as the ratio of the fraction of NET triads observed to the theoretical fraction of NET triads in a statistically random copolymer.

For example, a high molecular weight block of a diblock copolymer of 50 mole percent T and 50 mole percent N would have a single NET triad in each molecule, and hence would exhibit a virtually undetectable fraction of NET triads in a high molecular weight polymer. The ratio defining the degree of randomness would be approximately zero. The theoretical probability of a NET triad for a random copolymer would be 0.5. The ratio defining the degree of randomness for such a truly random copoloymer would be approximately 1.0 (100 percent).

The degree of randomness of NE- or TE- sequences can be approximated using the following theoretical approach, assuming equivalent reaction ratios of the two monomer materials. A more sophisticated analysis can be performed for those cases where the reaction ratios of the monomer units are not equivalent. For the purposes of this discussion, let:

Wn=mole fraction NE as charged or as measured by nuclear magnetic resonance spectroscopy (nmr);

Wt=mole fraction TE as charged or as measured by nmr;

Pnn=fraction of NEN sequences as measured by nmr;

Pnt=fraction of NET sequences as measured by nmr; and

Ptt=fraction of TET sequences as measured by nmr.

It follows that $$Wt+Wn=1$$

and $$Pnn+Pnt+Ptt=1.$$

Also, let P(j|i) equal the conditional probability of finding a "j" monomer next on the polymer chain given that the currently chosen monomer on the polymer chain is an "i" monomer sequence. There are four of these latter quantities, P(n|n), P(n|t), P(t|n) and P(t|t). In the limit of high molecular weight, the probability of an end group is essentially zero and then it follows that:

$$P(n|t)+P(t|t)=1$$

and $$P(n|n)+P(t|n)=1.$$

It also follows from the definition of conditional probabilities that $$Pnn=P(n|n)*Wn,$$

$$Ptt=P(t|t)*Wt,$$

and $$Pnt=P(n|t)*Wt+P(t|n)*Wn.$$

The above equations thus define the conditional probabilities in terms of NMR measurable quantities. In the special case of a random copolymer, the probability of finding a "j" monomer next is independent of "i" and then P(j|i) is merely Wj. Thus, for a random polymer:

$$Pnn=Wn*Wn,$$

$$Ptt=Wt*Wt,$$

and $$Pnt=2*Wn*Wt,$$

as asserted previously. In this high molecular weight limit, typically applicable in practice, the definition of % randomness now follows:

$$\% \text{ Randomness} = Pnt/(2*Wn*Wt) = Pnt(\text{observed})/Pnt(\text{random})$$

It should be noted that although the Wj's and Pij's are obtained from separate aspects of the nmr graphs, there is a further relationship between them. In general, these relations should also hold:

$$0.5*Pnt+Pnn=Wn,$$

and $$0.5*Pnt+Ptt=Wt$$

Particularly in the case of low levels of randomness, experimental error tends to create small discrepancies in these relationships. Given these discrepancies, as a practical matter the best definition of percent randomness is based on the experimental (observed) value of Pnt as given above. The probability of a k length sequence of j-monomer units (only valid when <k> is not on the order of the number of monomers in a single chain, so this assumes the high molecular weight limit) is simply the probability of k−1 successive occurrences given a first occurrence of a "j" monomer times the probability that the k+1 monomer is not a "j" monomer. Since every sequence must be some length it follows that:

$$\equiv \sum_{k=1}^{\infty} (P(j|j))^{k-1} * P(i \neq j|j) = 1.$$

The number average length of j-monomers is $$\equiv \sum_{k=1}^{\infty} k * P(j|j)^{k-1} * P(i \neq j|j) = 1$$

which reduces to $$=1/(1-P(j|j))$$

$$=\{Pjj/(Wj-Pjj)\}+1.$$

In the case of a random copolymer, this reduces still further to the quantity $(1-Wj)^{-1}$.

The more general case of a finite chain is presented by Frensdorff in *Macromolecules*, 4, 369 (1971). The conditional probability is slightly reduced by the probability of the chain ending, e.g. (P(j|j) is multiplied by an extent of rection near unity. An alternative "recursive" approach with similar results is given by Lopez-Serrano, et. Al. in *Polymer*, 21, 263 (1980). In any case, the characterization method as described here is applicable to block copolymers comprising units "A" and "B", and are not limited to the example case where A=NE and B=TE. In the examples to follow, a random copolymer of 70% NE block monomer composition has a number average NE block sequence length of only about 3. A random copolymer of 50% NE block composition has a number average NE block sequence length of only about 2. While not wishing to be bound by theory, it is believed that when the average sequence length is longer, various physical, optical or mechanical properties may be improved. For example, the amount of crystallinity may increase at a given drawing condition leading to higher birefringence or dimensional stability. The melting point may also be increased leading to a more stable film than the random case at elevated temperatures. In that refractive index is a key component to the performance of the optical device, then increasing block length should increase and/or maintain molecular orientation during and following the drawing processes, particularly for optical devices that are thermally stabilized by annealing or heat setting at elevated temperatures. One of the mechanisms that can stabilize or maintain the molecular orientation is the formation of crystallites during the drawing process. The onset of crystallization during draw can often result in an increase in the drawing force. As a result, a block copolymer capable of crystallization during orientation may exhibit an increase in the stress above and beyond that of a statistically random copolymer comprising the same monomers at any given point of a similar drawing process; that is, the block copolymer will tend to strain harden sooner than the statistically random, but otherwise identical, copolymer. Concomitant with the sooner strain hardening is a higher refractive index for a positively birefringent material in the draw direction and a higher birefringence for a given point in a given drawing process. Higher birefringence typically will result in higher gain when all other quantities are held constant.

In practice, several factors can alter the stress versus draw behavior, which can thus cause a change in the onset of strain hardening. Besides the percent randomness, increasing the molecular weight or I.V. of the continuous phase, increasing the relative composition of the block monomer unit with the higher glass transition temperature and/or more quickly crystallizing component (such as, for example, NE), and increasing the fraction of dispersed phase (such as, for example, syndiotactic polystyrene (sPS)) prior to a phase inversion, typically accelerate the onset of strain hardening. These factors are illustrative only, and should not be considered limiting. In general, each of these factors may also improve the birefringence and optical gain at normal incidence for a given set of process conditions.

In the following examples, the continuous phase comprises polyesters whose equilibrium state after transesterification is random or at least nearly random: the percent transesterification being 98% or higher.

COMPARATIVE EXAMPLE 1

A polymeric blend was extruded and cast into a film using extrusion techniques of the type described in U.S. Pat. No. 5,783,120 (Ouderkirk, et.al.). The blend comprised 57.6% by weight coPEN (70 mole % PEN and 30 mole % PET) as the continuous phase, 40% by weight Questra MA 405 syndiotactic polystyrene (available commercially from the Dow Chemical Co., Midland, Mich.) as the disperse phase, and 2.4% by weight Dylark 332 compatibilizer (available commercially from Nova Chemicals). The coPEN had an intrinsic viscosity (I.V.) of 0.57 (measured in 60% phenol, 40% dichlorobenzene).

A sequence analysis was performed on the cast film using proton nuclear magnetic resonance according to the method described in Stewart et al., *Polymer*, Vol. 34, pages 4060–4067 (1993). Three sharp resonances were observed corresponding to the ethylene glycol (E) protons in the NEN, NET, and TET triad sequences. The ratio of the observed probability of NET triad sequences to the theoretical probability of a NET triad sequence (expressed as a percentage)

defines the degree of randomness. The measured degree of randomness was 98.1%, which implies that the copolymer was virtually a random copolymer of PEN and PET.

The cast film was oriented first in the machine direction to a draw ratio of about 1.3:1 using a conventional length orienter. The sheet was then oriented uniaxially in the transverse direction using a conventional tenter. The final transverse draw ratio was approximately 5.4:1 based on the rail settings at the entrance and exit of the tenter. The stretch temperature was 118° C. (245° F.). Following orientation, the film was heat set temperature at 163° C. (325° F.)

The optical properties of the film were measured using a Perkin-Elmer Lambda-19 UV-visible spectrophotometer equipped with an integrating sphere and a Glans-Thompson cube polarizer. The average transmission was 83.5% for wavelengths of light between 400 and 700 nanometers whose polarization orientation was aligned with the pass direction of the film. Light whose polarization orientation was aligned with the block direction of the film had an average transmission of 16.3%. Gain was measured by placing the film into a C12P back light cavity. The on-axis luminance of the cavity with the film in place was 40.2% greater than the same apparatus without the film. The luminance at 40° to the normal axis with the film in place was 28.5% greater than the measured luminance of the apparatus without the film.

COMPARATIVE EXAMPLE 2

The coPEN from COMPARATIVE EXAMPLE 1 was extruded and cast into a transparent film, and the degree of randomness was measured to be 99.1%. Hence, the presence of the Questra MA 405 resin in COMPARATIVE EXAMPLE 1 did not appear to alter the ability to measure the degree of randomness of the polyester. The intrinsic viscosity of the final copolymer was measured as 0.526. The cast sheet was uniaxially oriented to a nominal stretch ratio of 6:1 in a laboratory batch stretcher at 115° C. The stress-strain relationship of the sheet was measured during orientation and is shown as Curve A in FIG. 1. The refractive index along the stretch direction at a wavelength of 632.8 nanometers was determined to be 1.766 for a true draw ratio of 5.30:1. In the other non-stretch, in-plane direction, the index of refraction was determined to be 1.600. Differential scanning calorimetry was used to measure the crystallinity and an apparent heat of 25.0 J/g was measured with a peak melting temperature of 205° C.

Figure 2:
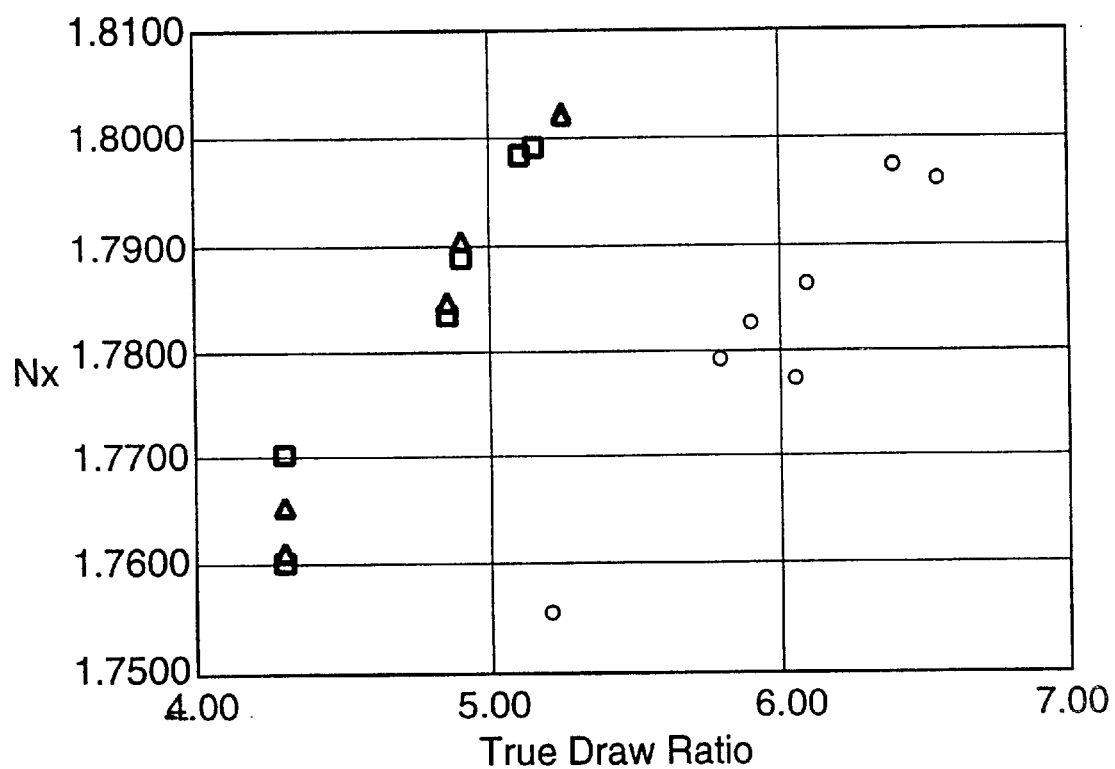
FIG. 2 is a plot of refractive index in the principle draw direction, Nx, for a positively birefringent material as a function of true draw ratio.

The cast sheet was further oriented to several different uniaxial draw ratios according to the conditions described above, with the exception that the draw temperature was 120° C. Using fiduciary marks scribed onto the cast sheet prior to orientation, the true draw ratios could be determined simply by taking the ratio of the distances between the marks following and prior to the orientation. The index of refraction in the principle draw direction was measured for various true draw ratios and are plotted as open circles in FIG. 2. As expected for this positively birefringent material, an increase in refractive index in the direction of draw as a function of draw ratio is observed.

EXAMPLES 1–2

A polymeric blend comprising 70 mole % PEN homopolymer and 30 mole % PET homopolymer was extruded and cast into a film. In EXAMPLE 1, the PEN had an I.V. of 0.56, and the PET had an I.V. of 0.60. The I.V. of the final copolymer was measured as 0.535. The degree of randomness was 23.4%. In EXAMPLE 2, the PEN had an I.V. of 0.56, and the PET had an I.V. of 0.85. The I.V. of the final copolymer was measured as 0.560. The degree of randomness was 30.9%. Sheets from both EXAMPLES 1 and 2 were transparent.

The sheets of EXAMPLES 1–2 were oriented similarly to the film of COMPARATIVE EXAMPLE 2, and the corresponding stress-strain curves were determined. The stress-strain relationship for EXAMPLES 1 and 2 are shown as Curves B and C, respectively, in FIG. 1. The copolymer of EXAMPLE 1, which has a slightly lower intrinsic viscosity and a lower degree of randomness, a slightly earlier strain-hardening than the, copolymer of EXAMPLE 2. The differences between Curves B and C are likely not statistically significant. However, the strain-hardening behavior of these curves are significantly different from the corresponding behavior of the statistically random copolymer of COMPARATIVE EXAMPLE 1 (Curve A), where strain-hardening is meant to describe the dependence of stress on the imposed orientational strain.

Cast sheets from EXAMPLES 1 and 2 were oriented to various true draw ratios as described in COMPARATIVE EXAMPLE 2. The refractive indices in the principle draw direction were measured and plotted in FIG. 2 as closed squares and open triangles, respectively. EXAMPLES 1 and 2 exhibit an increase in the refractive index along the direction of draw. Moreover in accordance with an earlier onset of strain-hardening, the refractive indices for EXAMPLES 1 and 2 are higher than the corresponding refractive index for COMPARATIVE EXAMPLE 2 for any given stretch condition.

Differential scanning calorimetry was used to measure the crystallinity. In EXAMPLE 1, an apparent heat fusion equal to 35.9 J/g was measured along with a peak melting temperature of 251° C. In EXAMPLE 2, an apparent heat of fusion equal to 35.3 J/g was measured along with a peak melting temperature of 244° C.

A similar series of stress strain experiments were performed at a draw temperature of 120° C. The strain-hardening appeared at a slightly higher draw ratio for EXAMPLES 1 and 2. The indices of all three were slightly reduced by about 0.01 in the stretch directions.

Without wishing to be bound by any particular theory, it would appear that the increase in stress at apparent uniaxial draw ratios greater than about 3 will translate into improved optical properties. For example, a greater difference in the refractive index between the continuous and disperse phases may be achieved in a continuous phase material exhibiting strain-hardening behavior relative to a continuous phase material that does not exhibit strain-hardening behavior at the same draw ratio.

For an optical device such as a reflective polarizer where the optical properties depend in part on the refractive index differential between the continuous phase and disperse phases along at least one axis, the block copolymers exemplified in EXAMPLES 1 and 2 should exhibit an increase in optical properties when used as part of a material combination described in COMPARATIVE EXAMPLE 1.

EXAMPLE 3

A film was prepared in accordance with the methodology of COMPARATIVE EXAMPLE 1, except that the blend of PEN and PET homopolymers from EXAMPLE 2 was substituted for the coPEN copolymer. The cast film had a degree of randomness of 8.7%. The cast film was first oriented to a stretch ratio of 1.25:1 using a conventional length orienter, and then drawn to a stretch ratio of 5.1:1 in the transverse direction at 118° C. (245° F.). The on-axis gain was 43.8%. The 40° gain was 20.1%.

Relative to COMPARATIVE EXAMPLE 1, this example demonstrates that a mixture of homopolymers and/or a lower degree of randomness may be used to achieve an increase in on-axis gain.

EXAMPLE 4

A film was made in accordance with the methodology of EXAMPLE 3, except that the PEN and PET homopolymers were those used in EXAMPLE 1. This sample had a degree of randomness of 10.8%. The on-axis gain was 42.8%. The 40° gain was 19.2%.

By comparing EXAMPLE 4 to EXAMPLE 3, it is seen that at a fixed degree of randomness, and nearly identical composition and process conditions, increasing the I.V. increases the gain.

EXAMPLE 5

A film was prepared in accordance with the methodology of EXAMPLE 3, except that the residence time of the melt was substantially increased compared to EXAMPLE 3 by including an additional filtration device in the melt stream. EXAMPLE 5 used two filters in the melt stream, whereas EXAMPLE 3 used only one filter, so the residence time was approximately doubled. By increasing residence time, the degree of randomness is increased. Control of residence time can be used to control the degree of randomness. The degree of randomness was 27.9%; the on-axis gain was 43.2%; and the 400 gain was 18.1%.

This example suggests that residence time associated with the melt affects the degree of randomness. This example also demonstrates that there need not be a linear dependence of optical performance with respect to the degree of randomness.

Figure 3:
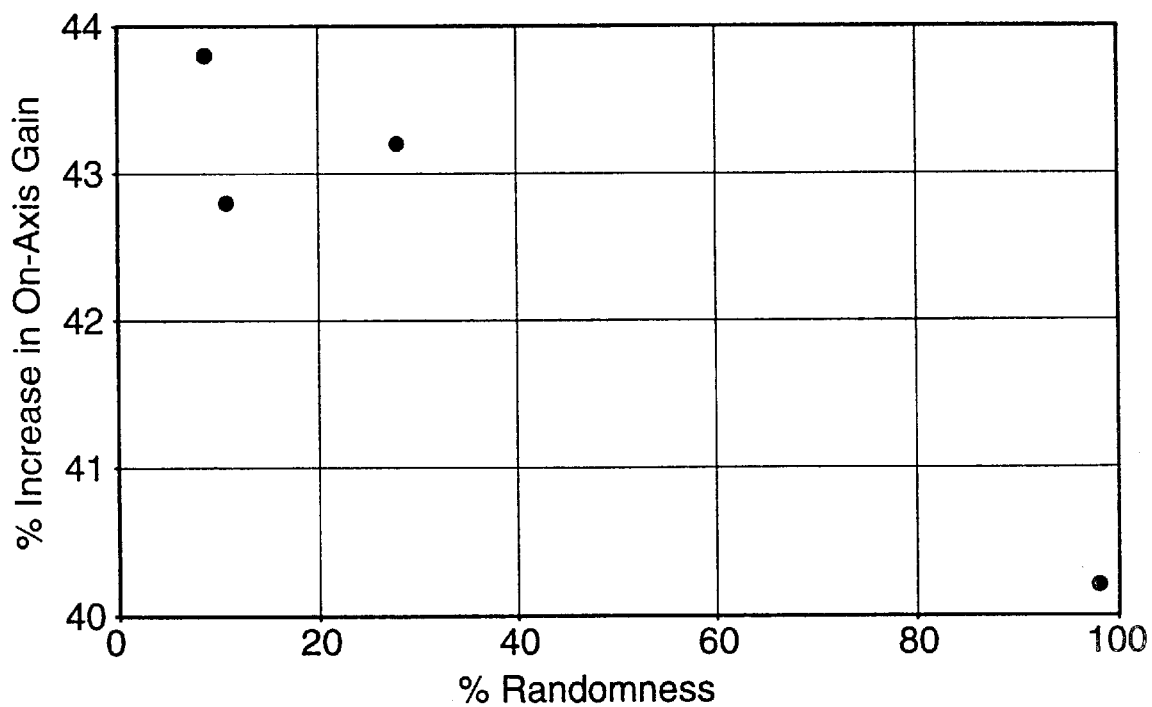
FIG. 3 is a plot of % increase in on-axis gain as a function of % randomness.

FIG. 3, which is a plot of on-axis gain versus degree of randomness for COMPARATIVE EXAMPLE 1 and EXAMPLES 3, 4, and 5, demonstrates the positive effect of blockiness in at least one of the phases of the continuous/disperse phase reflective polarizing device.

EXAMPLE 6

A film was prepared in accordance with the methodology of EXAMPLE 5 except that the tenter preheat temperature was 140° C. (285° F.) compared to 135° C. (275° F.) for Example 5. The sample had a degree of randomness of 28.5% and exhibited an on-axis gain of 41.9%.

EXAMPLE 7

This example demonstrates yet another range of intrinsic viscosities useful in the present invention. A film was made in accordance with the methodology of EXAMPLE 6, except that the PEN had an intrinsic viscosity of 0.48 and the PET had an intrinsic viscosity of 0.72. The sample had a degree of randomness of 25.2% and exhibited an on-axis gain of 40.4%. By comparing EXAMPLE 7 to EXAMPLE 6, it is seen that at nearly identical degrees of randomness and processing conditions, increasing the viscosity of the blended homopolymers increases the gain.

EXAMPLES 8–10

These examples demonstrate that varying degrees of randomness can be obtained for various compositions of PEN and PET.

The films of EXAMPLES 8–10 were prepared in accordance with the methodology of EXAMPLE 4, except that the PEN to PET composition ratios were 65/35, 60/40, and 55/45, respectively. The degrees of randomness were 11.7%, 9.4%, and 10.1%, respectively, for EXAMPLES 8, 9, and 10. The on-axis gains were 40.2%, 44.2%, and 43.9%, respectively, for EXAMPLES 8, 9, and 10. It should be noted that the 65/35 sample was stretched at about 10° C. hotter than the 60/40 and 55/45 samples, resulting in a lower gain than would be expected and thus the gain values reported are not directly comparable. The 40° gains were 27.0%, 24.8%, and 28.7%, respectively, for EXAMPLES 8, 9, and 10.

EXAMPLE 11

This example illustrates the effect of an increased degree of randomness on gain. A continuous/disperse phase blend was made in accordance with the methodology of Comparative EXAMPLE 1, except that the blend comprised 34.8% by weight of coPEN having a 70/30 mole percent ratio of PEN/PET, 22.8% by weight of 0.85 I.V. PET, 40% by weight of Questra MA 405, and 2.4% by weight of Dylark, resulting in an effective PEN to PET ratio of 55/45. The blend was then extruded and cast into a film using methodology similar to that of EXAMPLE 4. The degree of randomness was determined to be 71.0%. The on-axis gain was 37.9%. The 40° gain was 27.6%.

In comparison to EXAMPLE 10, where the degree of randomness was 10.1%, the film of this example, which had a degree of randomness of 71.0%, exhibited a reduction in gain, both on-axis and at 40°.

COMPARATIVE EXAMPLE 3

A sample of film was prepared from the cast film of COMPARATIVE EXAMPLE 1, except that the orientation process was performed on a laboratory batch stretcher where the orientation temperature was 115° C. and the final nominal stretch ratio was 6.0:1. Engineering stress measurements were taken during the process of orientation, and are represented as Curve D in FIG. 4. By comparing Curve A from FIG. 1 with Curve D from FIG. 4, it is obvious that the addition of a disperse phase altered the strain-hardening behavior, irrespective of the degree of randomness of the continuous phase.

EXAMPLE 12

A film was made in accordance with the methodology of COMPARATIVE EXAMPLE 3, except that it was prepared from cast sheet produced as part of EXAMPLE 3. The stress-strain measurements are shown as Curve F in FIG. 4.

EXAMPLE 13

A film was made in accordance with the methodology of COMPARATIVE EXAMPLE 3, using a cast web prepared similarly to that of EXAMPLE 3 except that the % randomness was 40%. The stress-strain measurements are shown as Curve E in FIG. 4.

Figure 4:
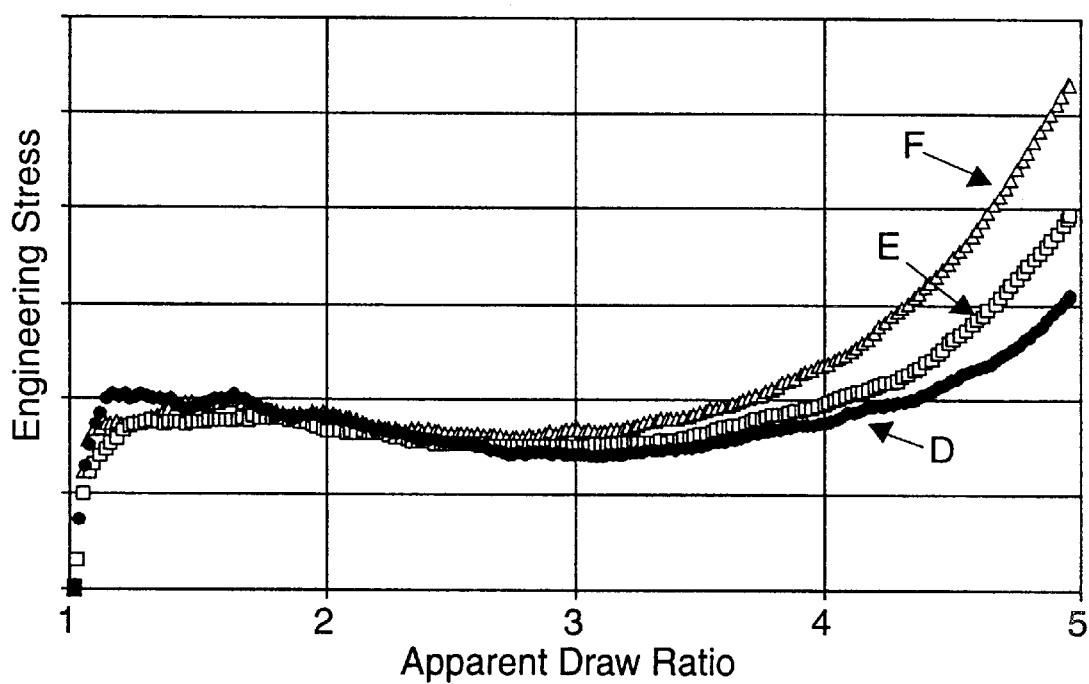
FIG. 4 is a plot of engineering stress as a function of apparent draw ratio.

Comparison of the three curves in FIG. 4 demonstrate that while the strain-hardening behavior may be altered by the presence of a disperse phase, there is a consistent decrease in the apparent draw ratio at which strain-hardening is initiated as the degree of randomness is decreased.

As discussed previously, the increase in stress at apparent uniaxial draw ratios greater than about 3 would be expected to translate into improved optical properties by producing a greater difference in refractive index for those material combinations that strain-harden sooner rather than later as a function of draw ratio.

EXAMPLES 14–16

Figure 5:
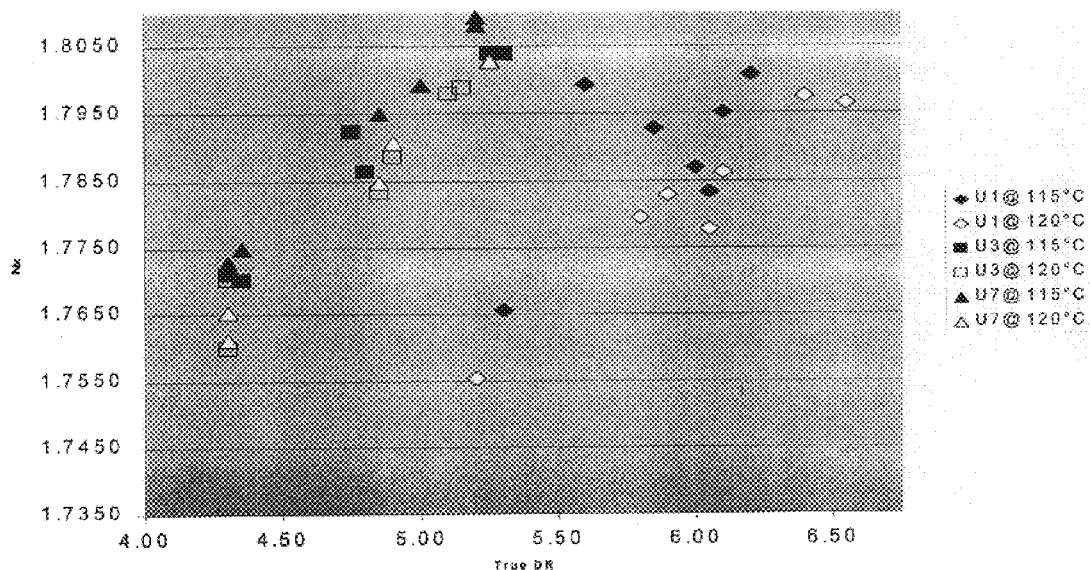
FIG. 5 is a plot of refractive index in the principle draw direction, Nx, for several positively birefringent materials as a function of true draw ratio.
Figure 6:
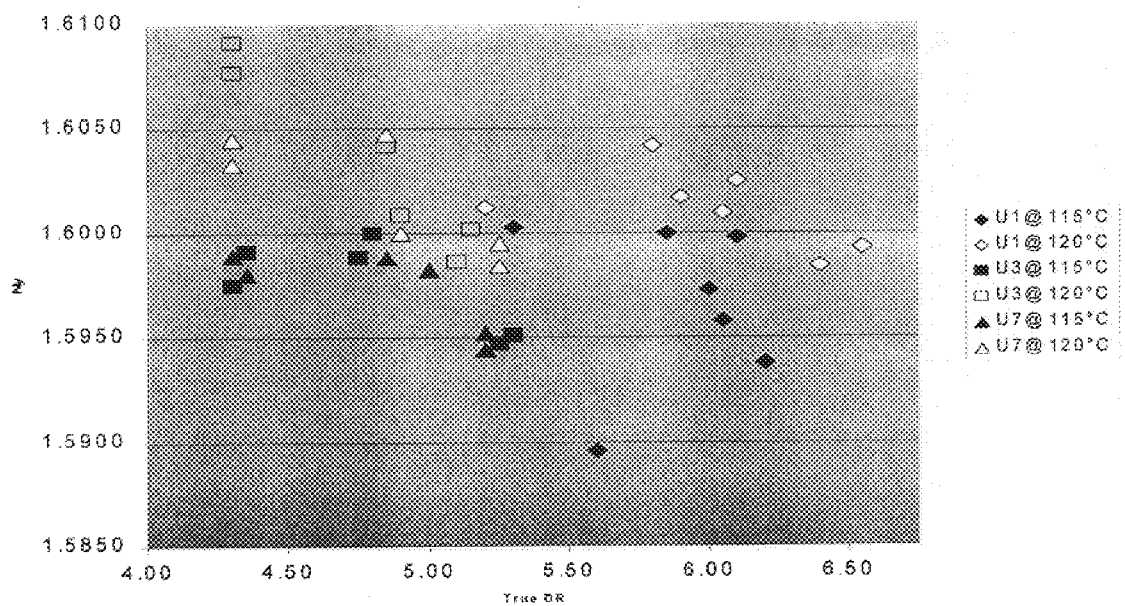
FIG. 6 is a plot of refractive index in the direction Ny transverse to the principle draw direction, for several positively birefringent materials as a function of true draw ratio.
Figure 7:
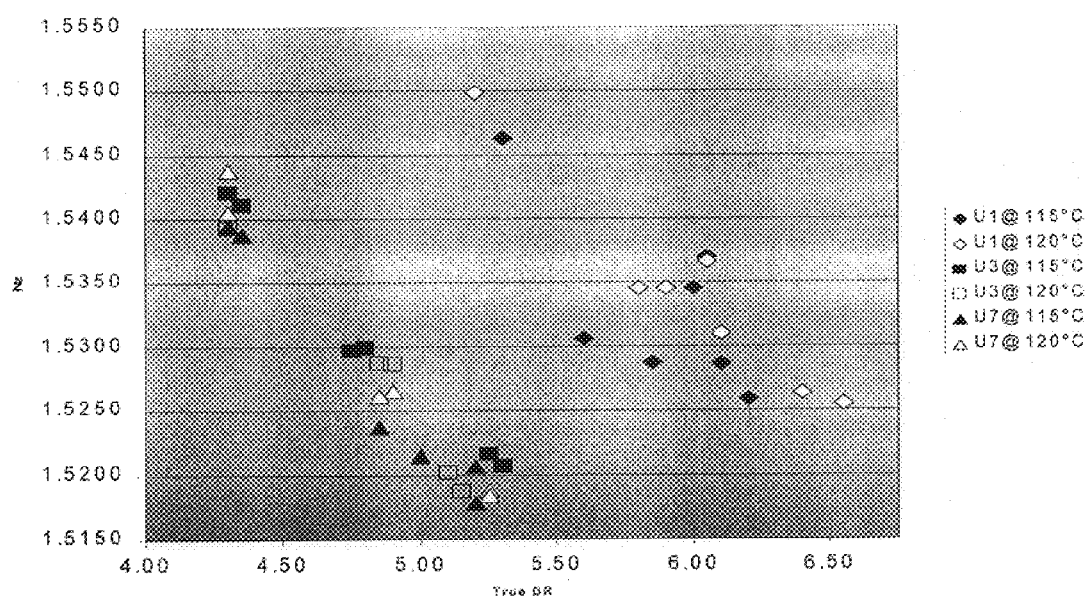
FIG. 7 is a plot of refractive index in the direction Nx perpendicular to the plane of the film for several positively birefringent materials as a function of true draw ratio.
Figure 8:
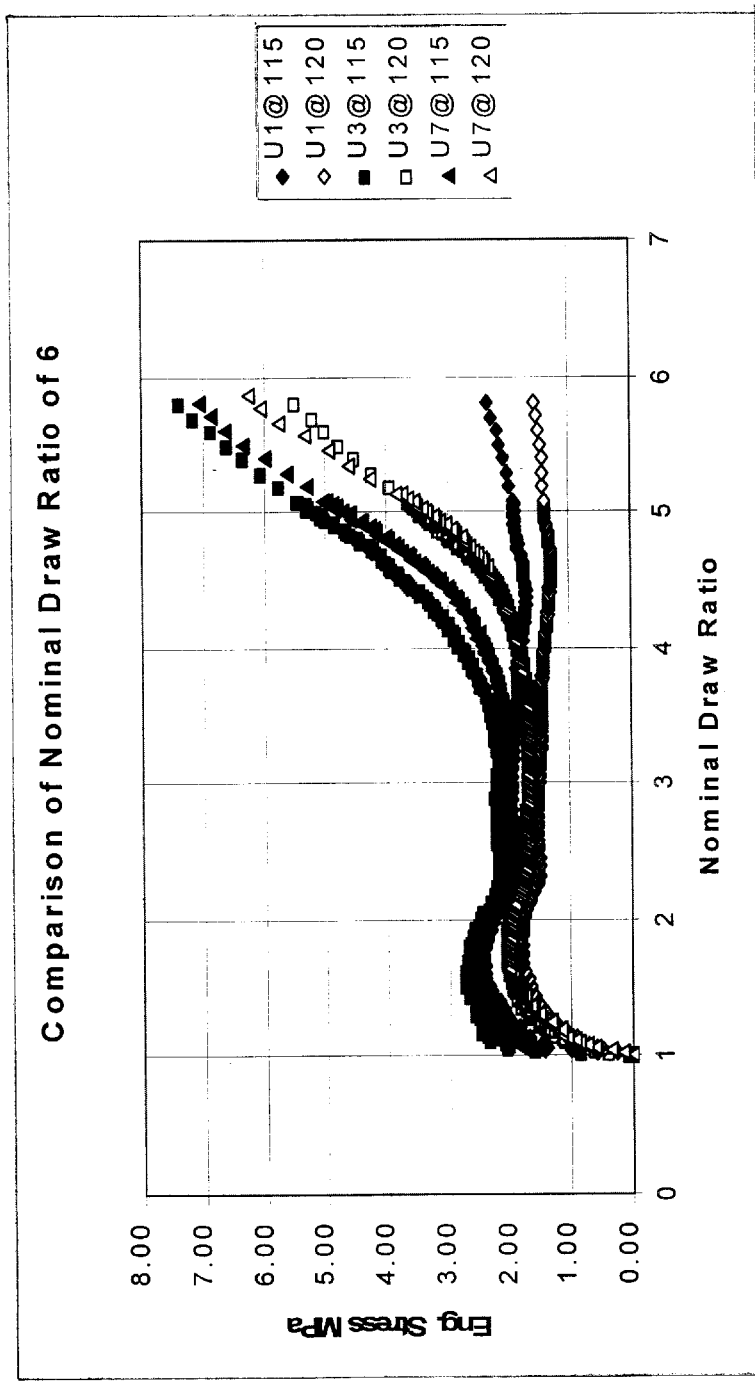
FIG. 8 is a plot of engineering stress as a function of nominal draw ratio.

The films of EXAMPLES 14–16 were made in accordance with the methodology of EXAMPLES 1–2. In EXAMPLE 14 (depicted as U1 in FIGS. 5–7), the material was a statistically random coPEN with an intrinsic viscosity of 0.57 and was 99.1% transesterified. In EXAMPLE 15 (depicted as U3 in FIGS. 5–7), the material was a 70%/30% blend of PEN and PET. The PEN had an intrinsic viscosity of 0.56 and the PET had an intrinsic viscosity of 0.58. The material was 23.4% transesterified. In EXAMPLE 16 (depicted as U7 in FIGS. 5–7), the material was a 70%/30% blend of PEN and PET. The PEN had an intrinsic viscosity of 0.56 and the PET had an intrinsic viscosity of 0.85. The material was 30.9% transesterified. The melting points of U1, U3 and U7 were found to be 205° C., 251° C., and 244° C., respectively. The glass transition temperatures of U1, U3 and U7 were found to be 104.7° C., 11.9° C., and 105.4° C., respectively. The refractive indices of all three materials were measured as a function of true draw ratio at both 115° C. and 120° C. The results are depicted in FIGS. 5–7. The engineering stress as a function of nominal draw ratio was determined for each of these materials at both 115° C. and 120° C. The results are depicted in FIG. 8.

The preceding description of the present invention is merely illustrative, and is not intended to be limiting. For example, reference is frequently made throughout the application to films. However, one skilled in the art will readily appreciate that the teachings set forth herein can be applied to other optical elements besides optical films, such as non-planar optical lenses. Therefore,.the scope of the present invention should be construed solely by reference to the appended claims.

What is claimed is:

1. A method of forming an optical device, comprising the steps of:
    creating a mixture having at least a first phase and a second phase, at least one of said phases comprising a blend of first and second homopolymers which are capable of inter-reacting; and
    inter-reacting said first and second homopolymers.

2. The method of claim 1, wherein said first and second homopolymers are inter-reacted before said mixture is created.

3. The method of claim 1, wherein said first and second homopolymers are inter-reacted after said mixture is created.

4. The method of claim 1, wherein said first and second homopolymers are polyesters and are inter-reacted via a transesterification reaction.

5. An optical body made according to claim 1, wherein said optical body exhibits a given birefringence at a lower strain than a corresponding optical body made from a second copolymer having the same monomers in the same ratio but not made from homopolymers.

6. An optical body made according to claim 1, wherein said optical body exhibits a birefringence that is higher for a given strain than a corresponding optical body made from a second copolymer having the same monomers in the same ratio but not made from homopolymers.

7. An optical body made according to claim 1, wherein said optical body exhibits a higher on-axis gain than a corresponding optical body made from a second copolymer having the same monomers in the same ratio but not made from homopolymers.

8. A polarizer made according to claim 1.

9. A forward-scattering diffuser made according to claim 1.

10. The method of claim 1, wherein said first and second homopolymers are reacted to give a copolymer having a degree of randomness of less than about 70%.

11. The method of claim 1, wherein said first and second homopolymers are reacted to give a copolymer having a degree of randomness of less than about 50%.

12. The method of claim 1, wherein said first and second homopolymers are reacted to give a copolymer having a degree of randomness of less than about 40%.

13. The method of claim 1, further comprising the step of: extruding the mixture into an optical film.

14. The method of claim 13, wherein the film has a continuous/disperse phase morphology.

15. The method of claim 1, wherein the blend is created at a non-zero shear rate, and wherein the viscosities of said first and second polymeric materials are essentially matched at said non-zero shear rate.

16. The method of claim 1, wherein said first and second homopolymers are inter-reacted to form a copolymer $P_n$ which has a lower degree of randomness than a statistically random copolymer $P_r$ formed from the sane monomers.

17. The method of claim 16, further comprising the step of stretching the copolymer $P_r$ in at least one direction such that copolymer $P_n$ exhibits a birefringence b, wherein $|b|>|k|$, and wherein k is the maximum birefringence obtainable by the statistically random copolymer $P_r$ at the same stretch ratio and under the same stretching conditions.

18. The method of claim 1, wherein the first and second homopolymers are PEN and PET, respectively, wherein the step of inter-reacting the first and second homopolymers results in a copolymer having a mole % NDC composition of between about 75% and 50%, and wherein the intrinsic viscosity of said copolymer is higher than that attainable from a second copolymer having the same monomers in the same ratio but not made from homopolymers.

19. The method of claim 1, wherein the first and second homopolymers are based on first and second monomers, respectively, wherein the step of inter-reacting the first and second homopolymers results in the formation of a first copolymer, and wherein the number average sequence length of said first monomer in said first copolymer is greater than the number average sequence length of said first monomer in a second statistically random copolymer based on the same monomers and ratios of monomers as said first copolymer.

20. The method of claim 1, wherein the first and second homopolymers are based on first and second monomers, respectively, wherein the step of inter-reacting the first and second homopolymers results in the formation of a first copolymer, and wherein the number average sequence length of the first and second monomers in the first copolymer is greater than that in a statistically random second copolymer having the same monomers in the same ratios.

21. The method of claim 1, wherein the step of inter-reacting the first and second homopolymers results in the formation of a copolymer $P_n$, and further comprising the steps of:
    providing a copolymer $P_r$, wherein copolymer $P_r$ contains essentially the same monomers, in essentially the same ratios, as copolymer $P_n$, wherein copolymer $P_r$ has a greater degree of randomness than copolymer $P_n$, and wherein at least one of $P_r$ and $P_n$ exhibits strain-induced birefringence;
    creating an article from copolymers $P_r$ and $P_n$ such that the copolymers are present in the first and second phases within the article; and orienting the article along at least one axis.

22. The method of claim 21, wherein the refractive index differential between said first and second domains is at least 0.01 along a first axis.

23. The method of claim 21, wherein each of $P_r$ and $P_n$ are polyesters, and wherein copolymers $P_r$ and $P_n$ have % transesterifications of k and t, respectively, where k>t.

24. The method of claim 21, wherein $P_r$ and $P_n$ are derived from monomers selected from the group consisting of monomers $m_1, \ldots, m_k$, wherein the % by weight of each of monomers $m_1, \ldots, m_k$ present in $P_r$, based on the total weight of $P_r$, is $w_{r1}, \ldots, w_{rk}$, respectively, wherein the % by weight of each of monomers $m_1, \ldots, m_k$ present in $P_n$, based on the total weight of $P_n$, is $w_{n1}, \ldots, w_{nk}$, respectively, wherein the magnitude of the vector $|w_r - w_n|$ is less than about 15%, where $w_r = [w_{r1}, \ldots, w_{rk}]$ and $w_n = [w_{n1}, \ldots, w_{nk}]$, and wherein copolymers $P_r$ and $P_n$ have % transesterifications of k and t, respectively, where k>t.

25. The method of claim 24, wherein the article is oriented along at least ore axis such that the difference in refractive indices between the first and second material domains is at least 0.03 along a first axis and is less than 0.01 along a second axis.

26. A polarizer, comprising:
a continuous phase and a disperse phase;
wherein at least one of said continuous and disperse phases comprises a blend of first and second homopolymers which are capable of inter-reacting to form a copolymer.

27. The polarizer of claim 26, wherein said first and second homopolymers are reacted to give a copolymer having a degree of randomness of less than about 70%.

28. The polarizer of claim 26, wherein said first and second homopolymers are reacted to give a copolymer having a degree of randomness of less than about 50%.

29. The polarizer of claim 26, wherein said first and second homopolymers are reacted to give a copolymer having a degree of randomness of less than about 40%.

30. A method for making an optical device, comprising the steps of:
providing a portion of material comprising a continuous phase and a disperse phase, wherein at least one of the continuous and disperse phases comprises a blend of at least a first and second homopolymer capable of inter-reacting; and
orienting the material in at least one direction until the material exhibits a level of birefringence $\Delta n$ which is greater than $\Delta n_{max}$, wherein $\Delta n_{max}$ is the maximum level of birefringence obtainable, under the same orientation conditions, for a portion of the continuous/disperse phase material of the same dimensions in which the blend is replaced by a like amount of a random copolymer comprising the same monomeric units, and the same ratios of monomeric units, as said blend.

31. The method of claim 30, wherein the material is oriented by stretching.

32. The method of claim 30, wherein $\Delta n \geq 0.05$.

33. The method of claim 30, wherein each of said first and second homopolymers are polyesters.

34. The method of claim 30, further comprising the step of:
inter-reacting said first and second homopolymers.

35. The method of claim 34, wherein each of said first and second homopolymers is a polyester, and wherein said first and second homopolymers are inter-reacted by way of a transesterification reaction.

36. The method of claim 34, wherein each of said first and second homopolymers is an amide, and wherein said first and second homopolymers are inter-reacted by way of a transamidation reaction.

37. The method of claim 34, wherein the inter-reaction produces a copolymer, and wherein the copolymer has a degree of randomness of less than about 70%.

38. The method of claim 34, wherein the inter-reaction produces a copolymer, and wherein the copolymer has a degree of randomness of less than about 50%.

39. The method of claim 34, wherein the inter-reaction produces a copolymer, and wherein the copolymer has a degree of randomness of less than about 40%.

40. A method for making an optical device, comprising the steps of:
providing a material comprising a continuous phase and a disperse phase,
wherein at least one of said continuous and disperse phases comprises a blend of at least first and second homopolymers;
inter-reacting said first and second homopolymers so as to produce a modified material; and
forming said modified material into an optical device.

41. The method of claim 40, wherein said optical device specularly transmits visible light polarized along a first axis and scatters visible light polarized along a second axis.

42. The method of claim 40, wherein said first and second homopolymers are polyesters.

43. The method of claim 40, wherein said first and second homopolymers are inter-reacted via a transesterification reaction.

44. The method of claim 40, wherein the inter-reaction produces a copolymer, and wherein the copolymer has a degree of randomness of less than about 70%.

45. The method of claim 40, wherein the inter-reaction produces a copolymer, and wherein the copolymer has a degree of randomness of less than about 50%.

46. The method of claim 40, wherein the inter-reaction produces a copolymer, and wherein the copolymer has a degree of randomness of less than about 40%.

* * * * *

UNITED STATES PATENT AND TRADEMARK OFFICE
CERTIFICATE OF CORRECTION

PATENT NO. : 6,627,300 B1
DATED : September 30, 2003
INVENTOR(S) : Kent, Susan L.

It is certified that error appears in the above-identified patent and that said Letters Patent is hereby corrected as shown below:

Title page,
Item [63], Related U.S. Application Data, delete "1997", in place thereof -- 1999 --.

Column 9,
Line 51, after "be" delete "30";

Colunm 14,
Line 11, after "randomness,", insert -- shows --;
Line 12, after "the" delete ",";

Column 15,
Line 32, delete "400", insert in place thereof -- 40º --;

Column 17,
Line 21, delete "11.9º", insert in place thereof -- 111.9º --;
Line 34, after ",", delete ".";

Column 18,
Line 23, delete "sane", insert in place thereof -- same --;
Line 25, delete "$P_r$", insert in place thereof -- $P_n$ --;

Column 19,
Line 20, delete "ore", insert in place thereof -- one --.

Signed and Sealed this

Thirteenth Day of July, 2004

JON W. DUDAS
*Acting Director of the United States Patent and Trademark Office*